United States Patent
Huang et al.

(10) Patent No.: US 8,208,903 B2
(45) Date of Patent: Jun. 26, 2012

(54) SYSTEM AND METHOD FOR REALIZING REMOTE CONTROL TO TERMINAL DATA

(75) Inventors: Zheng Huang, Shenzhen (CN); Xin Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 12/524,832

(22) PCT Filed: Dec. 19, 2007

(86) PCT No.: PCT/CN2007/003687
§ 371 (c)(1),
(2), (4) Date: Jul. 28, 2009

(87) PCT Pub. No.: WO2008/092336
PCT Pub. Date: Aug. 7, 2008

(65) Prior Publication Data
US 2010/0015942 A1    Jan. 21, 2010

(30) Foreign Application Priority Data
Jan. 29, 2007    (CN) .......................... 2007 1 0002493

(51) Int. Cl.
*H04M 1/66* (2006.01)
*H04M 1/68* (2006.01)
*H04M 3/16* (2006.01)

(52) U.S. Cl. ...................................... 455/411; 455/410
(58) Field of Classification Search .................. None
See application file for complete search history.

(56) References Cited

U.S. PATENT DOCUMENTS

| | | | | |
|---|---|---|---|---|
| 5,978,668 | A * | 11/1999 | Maeda et al. | ................. 455/410 |
| 6,771,954 | B1 * | 8/2004 | Yoneyama et al. | ........... 455/420 |
| 7,245,907 | B1 | 7/2007 | Numata | |
| 2004/0248562 | A1 | 12/2004 | Kim | |
| 2005/0113071 | A1 * | 5/2005 | Nagata | ......................... 455/411 |

FOREIGN PATENT DOCUMENTS

| | | |
|---|---|---|
| CN | 1882132 A | 12/2006 |
| EP | 1703708 | 9/2006 |
| WO | WO 2005/109658 | 11/2005 |
| WO | WO 2008/092336 | 8/2008 |

* cited by examiner

*Primary Examiner* — Ajit Patel
(74) *Attorney, Agent, or Firm* — Woodcock Washburn LLP

(57) ABSTRACT

The invention discloses a system for realizing remote control to terminal data comprising a terminal management subsystem and terminals, wherein the terminal management subsystem is used to receive a data operation request for the terminal, obtain information of the terminal according to the data operation request, transmit a data operation instruction to the terminal, and instruct the terminal to perform a user data operation; and the terminal is used to receive the data operation instruction from the terminal management subsystem and perform a data control operation on the data in the terminal according to the data operation instruction. The invention discloses also a method for realizing remote control to terminal data. In the case that the mobile terminal is lost or authorized temporarily to be used by others, the present invention can implement locking, wiping and unlocking the data of the terminal according to user requirements.

16 Claims, 2 Drawing Sheets

SYSTEM AND METHOD FOR REALIZING REMOTE CONTROL TO TERMINAL DATA

TECHNICAL FIELD

The present invention relates to mobile communication, and more particularly to a system and method for realizing remote control to terminal data.

TECHNICAL BACKGROUND

With improvement of storage capacity and processing ability of a mobile terminal, the terminal can store mass user data, including personal data such as phone book, short message, timing schedule, notepad, photo, etc., and commercial data such as mail for business transaction, special software, etc. In the case that the terminal which stores data of personal information is lost or authorized to be used by others, there is a need for a method of controlling the data to ensure them against leakage.

The current methods related to mobile locking mainly comprise utilizing the following mechanisms.

Terminal mobile phone password: after this function is opened, a password must be input when a mobile phone is started up, that is, this password is the locking for the mobile phone itself.

PIN (personal identification number) code (i.e. PIN1 code): it is a personal identification number code for SIM card security. After this function is enabled, a PIN1 code must be input when a mobile phone is started up, that is, this PIN1 code is the locking for SIM card. If the mobile phone password and the PIN1 code are used simultaneously, the PIN1 code is input first, and then the mobile phone password is input. After input error for the PIN1 code occurs for 3 times, the SIM card will be locked and a PUK code is needed to unlock it.

PIN2 code: it is a personal identification number code for functions such as restricting dialing, setting cost limit. If the function of restricting dialing is enabled, then only a pre-configured number can be dialed and a phone book is unusable in the mobile phone. After input error for the PIN2 code occurs for 3 times, the mobile phone will be locked and a PUK2 code is needed to unlock it.

Unlocking code for SIM card: it is mainly used for unlocking the function of locking SIM card to prevent an unknown and unapproved SIM card from being used in the mobile phone. The function of locking SIM card can be enabled. Thus, if the SIM card in the mobile phone is unapproved, an unlocking code needs to be input according to a prompt when the mobile phone is started up.

The four methods described above all involve direct manual operation on the terminal, and the codes needs to be preset. If the terminal is not at hand of the holder, the codes can not be set temporarily. For the case that the terminal is lost, the locking control described above can not be carried out as long as the terminal remains in start-up state; for the case that the terminal is authorized temporarily to be used by others, personal data stored by the holder can not be ensured against leakage without affecting basic functions.

In summary, at present, in the case that the mobile terminal is lost or authorized temporarily to be used by others, there is not yet a method which can ensure that all or part of personal data of a user can be efficiently controlled.

SUMMARY OF THE INVENTION

A technical problem to be solved by the present invention is to provide a system and method for realizing remote control to terminal data. In the case that the mobile terminal is lost or authorized temporarily to be used by others, the system and method can implement locking, wiping and unlocking for the data in the terminal according to user requirements, thereby ensuring privacy of personal data of a user.

In order to solve the problem described above, the present invention provides a system for realizing remote control to terminal data, comprising a terminal management subsystem and one or more terminals, wherein the terminal management subsystem is used to receive a data operation request for the terminal, obtain information of the terminal according to the data operation request, transmit a data operation instruction to the terminal, and instruct the terminal to perform a user data operation; and the terminal is used to receive the data operation instruction from the terminal management subsystem and perform a data control operation on the data in the terminal according to the data operation instruction.

Further, the terminal management subsystem is also used to carry out an authentication for a requestor who sends the data operation request, and obtain the information of the terminal according to the data operation request and instruct the terminal to perform the user data operation only after the authentication has been passed.

Further, the terminal management subsystem comprises a terminal management entity, a terminal management server and a terminal information database, wherein the terminal management entity is used to receive the data operation request for a certain terminal, carry out the authentication for the requestor who sends the data operation request, and authorize the terminal management server to perform a remote data operation on the data in the terminal after the authentication has been passed;

the terminal management server is used to obtain the information of the terminal by querying the terminal information database after getting the authentication, send the data operation instruction to the related mobile terminal according to the information, and instruct the terminal to perform the user data operation; and the terminal information database is used to store the information of the terminal and provide the information to the terminal management server.

Further, the terminal is also used to carry out the authentication after receiving the data operation instruction, and determine range and type of data contained in the data operation instruction and perform the data control operation on the data in the terminal based on the data operation instruction only after the authentication has been passed.

Further, the data operation instruction sent by the terminal management subsystem comprises the range and type of user data to be operated.

In addition, the range refers to all or part of the user data. In the case of part of the user data, specific data storage media and type are designated. If the data operation instruction does not designate the range and type of the user data, then the user data to be operated is defaulted as all of the user data.

The type refers to data locking, data wiping and data unlocking.

When the type is data locking and the range is all of the user data, the terminal locks an access interface in operating system level for all of the user data, meanwhile, and the terminal is allowed to receive incoming calls, dial emergency calls and initiate data sessions.

When the type is data locking and the range is part of the user data, the terminal locks an access interface of the specific data type designated by the data operation instruction, including the access interface for designated data in various applications.

When the type is data unlocking, the terminal unlocks an access interface for corresponding data in an unlocking instruction.

When the type is data wiping, the terminal wipes physically the type and range of data designated by a wiping instruction.

The present invention also provides a method for realizing remote control to terminal data. The method is applied to a system comprising a terminal management subsystem and one or more terminals, and comprises performing data locking, data wiping and data unlocking operation on data in the terminal. The method comprises the following steps:

(1) the terminal management subsystem receives a data operation request for a terminal;

(2) the terminal management subsystem obtains information of the terminal according to the data operation request, transmits a data operation instruction to the terminal, and instructs the terminal to perform a user data operation; and (3) the terminal performs a data control operation on the data in the terminal according to the received data operation instruction.

Further, in the step (2), the terminal management subsystem first carries out an authentication for a requestor who sends the data operation request before obtaining the information of the terminal according to the data operation request, and then obtains the information of the terminal after the authentication has been passed.

Further, the terminal management subsystem comprises a terminal management entity, a terminal management server and a terminal information database, and the step (2) comprises the following steps:

(2.1) the terminal management entity carries out the authentication for the requestor after receiving the data operation request for a certain terminal, and authorizes the terminal management server to perform a remote data operation on the data in the mobile terminal after the authentication has been passed; and (2.2) the terminal management server obtains the information of the terminal by querying the terminal information database after getting the authentication, sends the data operation instruction to the related mobile terminal according to the information, and instructs the terminal to perform the user data operation.

Further, the step (3) comprises the following steps:

(3.1) the terminal carries out the authentication for the data operation instruction;

(3.2) the terminal determines range and type of data contained in the data operation instruction; and (3.3) the terminal performs the data operation instruction, and performs the data control operation on the data in the terminal according to the data operation instruction.

Further, the data operation instruction comprises range and type of user data to be operated.

The range refers to all or part of the user data. In the case of part of the user data, specific data storage media and type are designated. If the data operation instruction does not designate the range and type of the user data, then the user data to be operated is defaulted as all of the user data.

The type refers to data locking, data wiping and data unlocking.

When the type is data locking and the range is all of the user data, in the step (3), the terminal locks an access interface in operating system level for all of the user data, and meanwhile, the terminal is allowed to receive incoming calls, dial emergency calls and initiate data sessions.

When the type is data locking and the range is part of the user data, in the step (3), the terminal locks an access interface of the specific data type designated by a locking instruction, including the access interface for designated data in various applications.

When the type is data unlocking, in the step (3), the terminal unlocks an access interface for corresponding data in an unlocking instruction.

When the type is data wiping, in the step (3), the terminal wipes physically the type and range of data designated by a wiping instruction.

Remote locking, wiping and unlocking operation on the data in the terminal can be performed simply and conveniently using the present invention. Operations on the user data can be performed more flexibly according to the range and type of the user data to be operated which are designated by the data operation instruction so as to satisfy various user requirements. When the user loses his terminal, the user data can be locked or wiped to prevent personal information from leaking. When the user temporarily authorizes others to use his terminal, part of personal information can be locked to prevent it from being peeped. After the user retrieves his terminal, he can unlock the user data to recovery its normal functions.

PREFERRED EMBODIMENTS OF THE INVENTION

Figure 1:
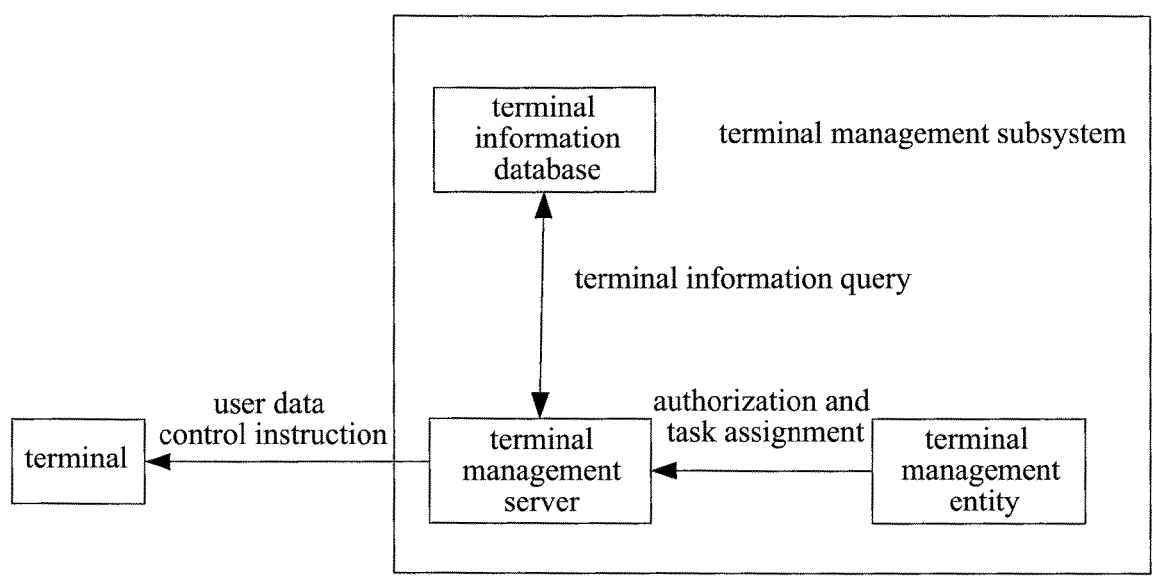
FIG. 1 is a schematic view of the system for implementing an embodiment of the present invention.

As shown in FIG. 1, the system according to an embodiment of the present invention comprises a terminal management subsystem and one or more terminals, wherein the terminal management subsystem is used to receive a data operation request for the terminal, obtain information of the terminal according to the data operation request, transmit a data operation instruction to the terminal, and instruct the terminal to perform a user data operation; and the terminal refers to a generalized mobile terminal, that is, the terminal comprises the mobile terminal itself and components such as SIM card, SIK card, memory card and the like carried by the mobile terminal. The terminal is used to receive the data operation instruction from the terminal management subsystem and perform a data control operation on data in the terminal according to the data operation instruction.

In order to avoid a mis-operation on data, an authentication for the data operation request is needed. Thus, the terminal management subsystem carries out the authentication for a requestor who sends the data operation request, and instructs the terminal to perform the user data operation only after the authentication has been passed. In addition, the terminal also carries out the authentication after receiving the data operation instruction and performs the data control operation on the data in the terminal only after the authentication has been passed.

The terminal management subsystem can be a server which integrates processing, external interface and database, or it can comprise more than one server with different servers completing different functions. Specifically speaking, the terminal management subsystem comprises three components:

a terminal management entity, a terminal management server and a terminal information database.

Wherein, the terminal management entity can be an independent client service system of operators or a service management platform, or it can be integrated with the terminal management server on a network side. The terminal management entity accepts a service request of a user, i.e., a data operation request, instructs the terminal management server to perform a specific terminal management operation such as the authentication for the requestor according to a predetermined business strategy and business process, and authorizes the terminal management server to perform a remote data operation on the data in the terminal after the authentication has been passed.

The terminal management server is a function entity performing a terminal management operation, and it accepts tasks assigned by the terminal management entity, obtains the information of the requesting terminal by querying the terminal information database, selects an appropriate communication mode and processing strategy to send the data operation instruction to the related mobile terminal according to the information, and instructs the terminal to perform the user data operation, that is, instructs a remote terminal to perform corresponding data locking, data wiping and data unlocking operation over the air.

The terminal information database can be a special database provided on the network side, or it can be a database integrated by the terminal management server on the network side by different ways such as parameters collection, user's automatic report, or administrator's manual maintenance. The terminal information database is used to store the information of the terminal, such as information of IMSI, IMEI, terminal' type and its ability such as whether open mobile alliance device management (OMA DM) is supported.

An embodiment of the present invention also provides a method for realizing remote control for data in a terminal. The method comprises: the terminal management subsystem receives a data operation request for the terminal, obtains the information about the terminal according to the data operation request, transmits a data operation instruction to the terminal, and instructs the terminal to perform a user data operation; and the terminal performs a data control operation on the data in the terminal according to the received data operation instruction.

Figure 2:
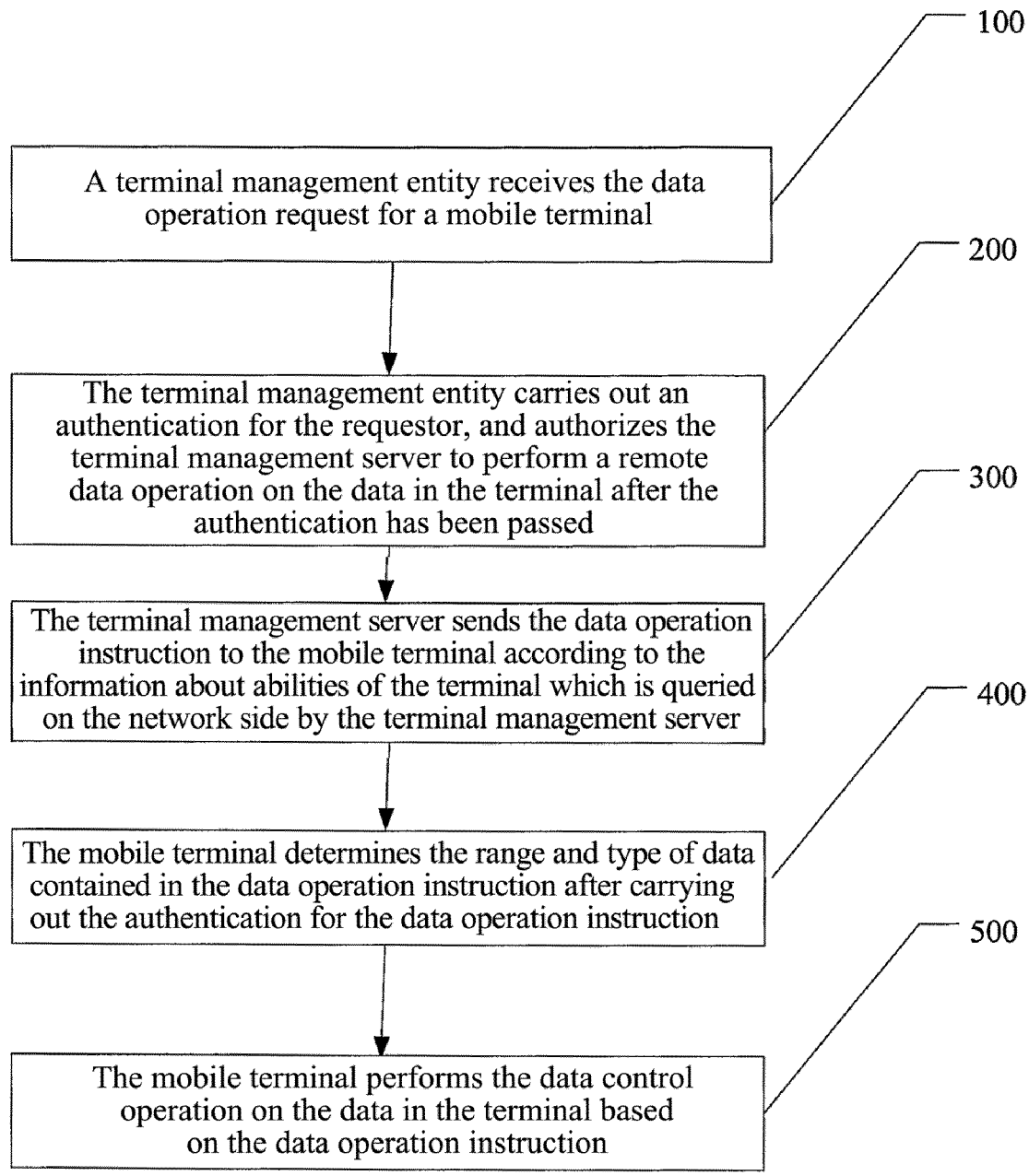
FIG. 2 is a flowchart of implementing an embodiment of the present invention.

The method will be described in detail below in conjunction with FIG. 2 and comprises the following steps:

step 100: a terminal management entity receives the data operation request for a mobile terminal.

The type of the data operation can be determined as data locking, wiping and unlocking according to user requirements.

When the user loses his terminal, he can send a data locking or wiping request to the terminal management entity.

When the user temporarily authorizes others to use his terminal, he can send a data locking request to the terminal management entity to lock all or part of data to prevent personal information from leaking.

When the user retrieves his terminal, he can send a data unlocking request to the terminal management entity to unlock all or part of the previously locked data.

step 200: the terminal management entity carries out an authentication for the requestor, and authorizes the terminal management server to perform a remote data operation on the data in the terminal after the authentication has been passed; and step 300: the terminal management server queries a terminal information database to obtain essential information about the abilities of the requesting terminal after getting the authentication, selects an appropriate communication mode and processing strategy to send the data operation instruction to the related mobile terminal according to the essential information, and instructs the terminal to perform a corresponding data operation.

The terminal information database can be a special database provided on the network side, or it can be a database integrated by the terminal management server on the network side by different ways such as parameters collection, user's automatic report, or administrator's manual maintenance. The terminal information database stores the information of the terminal, such as information about IMSI, IMEI, type of the terminal and its ability such as whether OMA DM is supported.

The data operation instruction designates specifically range and type of the user data to be operated, and the range can be all or part of the user data. In the case of part of the user data, specific data storage media and type need to be designated. For example, the data type is one or more of phone book, short message, timing schedule, notepad, photo and the like, and the data storage media is SIM card.

If the data operation instruction does not designate the range and type of the user data, then the user data is defaulted as all of the user data. If the type of the user data is designated but the media is not designated, then the storage media of all of the user data includes storage devices such as SIM card, SIK card, memory card, terminal memory and the like.

The data operation instruction also comprises commands to activate mobile phone start-up password, PIN code for SIM card, PIN2 code, unlocking code for SIM card, password of memory card and resetting password.

The data operation instruction is transmitted to the terminal over the air by various communication ways, including but not limited to non-connective information, connective unstructured supplementary service data (USSD), hyper text transfer protocol (HTTP) and open mobile alliance device management (OMA DM).

step 400: the mobile terminal determines the range and type of data contained in the data operation instruction after carrying out the authentication for the data operation instruction; and step 500: the mobile terminal performs the data operation instruction, and performs the data control operation on the data in the terminal based on the data operation instruction.

When the terminal performs a locking instruction, it locks an access interface in operating system level for all of the user data if the range is all of the user data, which is similar to the locking of the mobile phone itself, but the terminal can be allowed to receive incoming call, dial emergency call and initiate data session. If the range is part of the user data, the terminal locks an access interface of the specific data type designated by the locking instruction, comprising an access interface for designated data in various applications.

After the user data in the terminal is locked, local operations such as start-up and shutdown of the terminal, replacement of SIM card and removal of battery have no effect on the implemented locking function for the user data.

When the terminal performs an unlocking instruction, it unlocks an access interface for corresponding data in the data unlocking instruction. The terminal can be reused normally and the set password keeps as before after unlocking. The unlocking can be implemented by inputting the preset start-up password of the mobile phone at the terminal.

When the terminal performs a wiping instruction, the data type and range designated by the wiping instruction can be wiped physically.

Locking, wiping and unlocking operation on the data in the terminal can be performed simply and conveniently using the present invention. Operations on the user data can be performed more flexibly according to the range and type of the user data to be operated which are designated by the data operation instruction so as to satisfy the various user requirements. When the user loses his terminal, the user data can be locked or wiped to prevent personal information from leaking. When the user temporarily authorizes others to use his terminal, part of personal information can be locked to prevent it from being peeped. After the user retrieves his terminal, he can unlock the user data to recovery its normal functions.

Although the present invention is described in conjunction with specific embodiments, various modifications and variations can be made by those skilled in the art without departing from the spirit or scope of the present invention. Thus the modifications and variations can be regarded as within the scope of the invention and the scope of the appended claims.

INDUSTRIAL APPLICABILITY

The present invention provides a system and method for realizing remote control to terminal data. The system and method can perform simply and conveniently remote locking, wiping and unlocking operation on user data in a mobile terminal, designate range and type of the user data to be operated, perform flexibly operations on the user date with strong pertinence so as to satisfy various user requirements.

What is claimed is:

1. A system for realizing remote control to terminal data comprising a terminal management subsystem and one or more terminals, wherein
the terminal management subsystem is used to receive a data operation request for the terminal, to obtain information about the terminal according to the data operation request, to transmit a data operation instruction to the terminal, and to instruct the terminal to perform a user data operation; and
the terminal is used to receive the data operation instruction from the terminal management subsystem and perform a data control operation on data in the terminal according to the data operation instruction;
wherein the data operation instruction comprises a range and type of user data to be operated upon; and wherein the range refers to all or part of the user data, and the type refers to data locking, data wiping and data unlocking; and
wherein, in the case of the range referring to part of the user data, specific data storage media and type are designated; and if the data operation instruction does not designate the range and type of the user data, then the user data to be operated upon is defaulted to be all of the user data.

2. The system according to claim 1, wherein the terminal management subsystem is also used to carry out an authentication for a requestor who sends the data operation request, to obtain the information about the terminal according to the data operation request and to instruct the terminal to perform the user data operation only after the authentication has been passed.

3. The system according to claim 1, wherein the terminal management subsystem comprises a terminal management entity, a terminal management server and a terminal information database, wherein
the terminal management entity is used to receive the data operation request for the terminal, to carry out an authentication for the requestor who sends the data operation request, and to authorize the terminal management server to perform a remote data operation on the data in the terminal after the authentication has been passed;
the terminal management server is used to obtain the information about the terminal by querying the terminal information database after getting the authentication, to send the data operation instruction to the terminal according to the information, and to instruct the terminal to perform the user data operation; and
the terminal information database is used to store the information about the terminal and to provide the information to the terminal management server.

4. The system according to claim 1, wherein the terminal is also used to carry out an authentication after receiving the data operation instruction, to determine the range and type of data contained in the data operation instruction and to perform the data control operation on the data in the terminal based on the data operation instruction only after the authentication has been passed.

5. The system according to claim 1, wherein
when the type is data locking and the range is all of the user data, the terminal locks an access interface in an operating system level for all of the user data, and meanwhile, the terminal is allowed to receive incoming calls, to dial emergency calls and to initiate data sessions;
when the type is data locking and the range is part of the user data, the terminal locks the access interface of the specific data type designated by the data operation instruction, comprising the access interface for designated data in various applications;
when the type is data unlocking, the terminal unlocks the access interface for corresponding data in an unlocking instruction; and
when the type is data wiping, the terminal wipes physically the type and range of data designated by a wiping instruction.

6. A method for realizing remote control to terminal data, wherein the method is applied to a system comprising a terminal management subsystem and one or more terminals and comprises performing data locking, data wiping and data unlocking operations on data in the terminal, the method comprising the following steps:
(1) the terminal management subsystem receiving a data operation request for the terminal;
(2) the terminal management subsystem obtaining information about the terminal according to the data operation request, transmitting a data operation instruction to the terminal, and instructing the terminal to perform a user data operation; and
(3) the terminal performing a data control operation on the data in the terminal according to the received data operation instructions
wherein the data operation instruction comprises a range and type of user data to be operated upon; and wherein the range refers to all or part of the user data, and the type refers to data locking, data wiping and data unlocking; and
wherein, in the case of the range referring to part of the user data, specific data storage media and type are designated; and if the data operation instruction does not designate the range and type of the user data, then the user data to be operated upon is defaulted to be all of the user data.

7. The method according to claim 6, wherein in the step (2), the terminal management subsystem first carries out an authentication for a requestor who sends the data operation request before obtaining the information about the terminal according to the data operation request, and then obtains the information about the terminal after the authentication has been passed.

8. The method according to claim 6, wherein the terminal management subsystem comprises a terminal management entity, a terminal management server and a terminal information database, and wherein the step (2) comprises the following steps:
- (2.1) the terminal management entity carrying out an authentication for the requestor after receiving the data operation request for the terminal, and authorizing the terminal management server to perform a remote data operation on the data in the terminal after the authentication has been passed; and
- (2.2) the terminal management server obtaining the information about the terminal by querying the terminal information database after getting the authentication, sending the data operation instruction to the terminal according to the information, and instructing the terminal to perform the user data operation.

9. The method according to claim 6, wherein the step (3) comprises the following steps:
- (3.1) the terminal carrying out an authentication for the data operation instruction;
- (3.2) the terminal determining the range and type of data contained in the data operation instruction; and
- (3.3) the terminal performing the data operation instruction, and performing the data control operation on the data in the terminal according to the data operation instruction.

10. The method according to claim 6, wherein
when the type is data locking and the range is all of the user data, in the step (3), the terminal locks an access interface in an operating system level for all of the user data, meanwhile, the terminal is allowed to receive incoming calls, to dial emergency calls and to initiate data sessions;
when the type is data locking and the range is part of the user data, in the step (3), the terminal locks the access interface of the specific data type designated by a locking instruction, comprising the access interface for designated data in various applications;
when the type is data unlocking, in the step (3), the terminal unlocks the access interface for corresponding data in an unlocking instruction; and
when the type is data wiping, in the step (3), the terminal wipes physically the type and range of data designated by a wiping instruction.

11. The system according to claim 2, wherein
when the type is data locking and the range is all of the user data, the terminal locks an access interface in an operating system level for all of the user data, and meanwhile, the terminal is allowed to receive incoming calls, to dial emergency calls and to initiate data sessions;
when the type is data locking and the range is part of the user data, the terminal locks the access interface of the specific data type designated by the data operation instruction, comprising the access interface for designated data in various applications;
when the type is data unlocking, the terminal unlocks the access interface for corresponding data in an unlocking instruction; and
when the type is data wiping, the terminal wipes physically the type and range of data designated by a wiping instruction.

12. The system according to claim 3, wherein
when the type is data locking and the range is all of the user data, the terminal locks an access interface in an operating system level for all of the user data, and meanwhile, the terminal is allowed to receive incoming calls, to dial emergency calls and to initiate data sessions;
when the type is data locking and the range is part of the user data, the terminal locks the access interface of the specific data type designated by the data operation instruction, comprising the access interface for designated data in various applications;
when the type is data unlocking, the terminal unlocks the access interface for corresponding data in an unlocking instruction; and
when the type is data wiping, the terminal wipes physically the type and range of data designated by a wiping instruction.

13. The system according to claim 4, wherein
when the type is data locking and the range is all of the user data, the terminal locks an access interface in an operating system level for all of the user data, and meanwhile, the terminal is allowed to receive incoming calls, to dial emergency calls and to initiate data sessions;
when the type is data locking and the range is part of the user data, the terminal locks the access interface of the specific data type designated by the data operation instruction, comprising the access interface for designated data in various applications;
when the type is data unlocking, the terminal unlocks the access interface for corresponding data in an unlocking instruction; and
when the type is data wiping, the terminal wipes physically the type and range of data designated by a wiping instruction.

14. The method according to claim 7 wherein
when the type is data locking and the range is all of the user data, in the step (3), the terminal locks an access interface in an operating system level for all of the user data, meanwhile, the terminal is allowed to receive incoming calls, to dial emergency calls and to initiate data sessions;
when the type is data locking and the range is part of the user data, in the step (3), the terminal locks the access interface of the specific data type designated by a locking instruction, comprising the access interface for designated data in various applications;
when the type is data unlocking, in the step (3), the terminal unlocks the access interface for corresponding data in an unlocking instruction; and
when the type is data wiping, in the step (3), the terminal wipes physically the type and range of data designated by a wiping instruction.

15. The method according to claim 8, wherein
when the type is data locking and the range is all of the user data, in the step (3), the terminal locks an access interface in an operating system level for all of the user data, and meanwhile, the terminal is allowed to receive incoming calls, to dial emergency calls and to initiate data sessions;
when the type is data locking and the range is part of the user data, in the step (3), the terminal locks the access interface of the specific data type designated by a locking instruction, comprising the access interface for designated data in various applications;
when the type is data unlocking, in the step (3), the terminal unlocks the access interface for corresponding data in an unlocking instruction; and when the type is data wiping, in the step (3), the terminal wipes physically the type and range of data designated by a wiping instruction.

16. The method according to claim 9, wherein
when the type is data locking and the range is all of the user data, in the step (3), the terminal locks an access interface in an operating system level for all of the user data, and meanwhile, the terminal is allowed to receive incoming calls, to dial emergency calls and to initiate data sessions;
when the type is data locking and the range is part of the user data, in the step (3), the terminal locks the access interface of the specific data type designated by a locking instruction, comprising the access interface for designated data in various applications;
when the type is data unlocking, in the step (3), the terminal unlocks the access interface for corresponding data in an unlocking instruction; and
when the type is data wiping, in the step (3), the terminal wipes physically the type and range of data designated by a wiping instruction.

\* \* \* \* \*

UNITED STATES PATENT AND TRADEMARK OFFICE
CERTIFICATE OF CORRECTION

| | | |
|---|---|---|
| PATENT NO. | : 8,208,903 B2 | |
| APPLICATION NO. | : 12/524832 | |
| DATED | : June 26, 2012 | |
| INVENTOR(S) | : Zheng Huang et al. | |

It is certified that error appears in the above-identified patent and that said Letters Patent is hereby corrected as shown below:

Column 8, line 54, delete "instructions" and insert --instruction;-- therefor.

Signed and Sealed this
Eighth Day of January, 2013

David J. Kappos
*Director of the United States Patent and Trademark Office*